United States Patent [19]

Hasegawa

[11] Patent Number: 4,659,879

[45] Date of Patent: Apr. 21, 1987

[54] KEY SWITCH

[75] Inventor: Hiroshi Hasegawa, Tokyo, Japan

[73] Assignee: Topre Corporation, Tokyo, Japan

[21] Appl. No.: 813,064

[22] Filed: Dec. 24, 1985

[30] Foreign Application Priority Data

Mar. 11, 1985 [JP] Japan .................................. 60-47775

[51] Int. Cl.[4] ...................... H01H 13/70; H01G 5/01; G08C 9/02

[52] U.S. Cl. ............................ 200/5 A; 200/DIG. 1; 200/159 B; 340/365 C; 361/288

[58] Field of Search .............. 200/5 A, 52 R, DIG. 1, 200/159 B; 361/288; 340/365 R, 365 C

[56] References Cited

U.S. PATENT DOCUMENTS

| | | | |
|---|---|---|---|
| Re. 30,435 | 11/1980 | Fukao | 200/DIG. 1 X |
| 3,797,630 | 3/1974 | Zilkha | 361/288 X |
| 3,951,250 | 4/1976 | Pointon et al. | 361/288 X |
| 4,127,740 | 11/1978 | LaMarche | 200/5 A X |
| 4,303,811 | 12/1981 | Parkinson | 200/5 A X |
| 4,356,358 | 10/1982 | Fukukura | 200/5 A |
| 4,359,720 | 11/1982 | Chai et al. | 340/365 C |
| 4,380,040 | 4/1983 | Posset | 200/DIG. 1 X |
| 4,415,781 | 11/1983 | Frame | 200/DIG. 1 X |

*Primary Examiner*—J. R. Scott
*Attorney, Agent, or Firm*—Oblon, Fisher, Spivak, McClelland & Maier

[57] ABSTRACT

A key switch including a substrate prepared from dielectric material, and first and second electrodes respectively formed on the bottom and top surfaces of the substrate to constitute a capacitor together with the substrate. The first electrode is electrically connected to a pulse voltage signal oscillator, thereby pulsatively storing a static capacitance between the first and second electrodes. A first fixed contact electrically connected to the second electrode is provided on that portion of the surface of the substrate. A second fixed contact is positioned near the first fixed contact. The first and second fixed contacts are electrically connected or shut by a manually operable movable conductive rubber contact.

11 Claims, 11 Drawing Figures

KEY SWITCH

BACKGROUND OF THE INVENTION

This invention relates to a key switch adapted to be used with a keyboard fitted to a computer, cash register, motorized typewriter and other electronic appliances.

The known key switch used with the above-mentioned various electronic appliances comprises the so-called mechanical type wherein a pair of fixed contacts are electrically connected together or shut off from each other by the selective operation of a movable contact unit, and the so-called capacitive type whose operation is controlled by the magnitude of capacitance stored between a pair of electrodes.

Obviously, these mechanical key switch and capacitive key switch have both merits and demerits. A keyboard fitted with either type of key switch has the drawbacks that its manufacture is time consuming, resulting in a high cost. For instance, a keyboard fitted with a mechanical key switch is handicapped by the fact that due to the specific construction of the mechanical switch, the keyboard substrate must be provided with a diode for each key switch. Fitting numerous diodes to the surface of the keyboard substrate consumes a great deal of time.

In contrast, a keyboard equipped with a capacitive key switch also has the defects that, when the keyboard substrate is provided with print wiring only on one side, the substrate should be provided with a jumper for each key switch in view of the specific structure of the capacitive key switch itself. In this case, too, the manufacture of a keyboard takes as long time as that of the type fitted with a mechanical key switch.

Referring to a keyboard provided with a capacitive key switch, it may be possible to omit the fitting of the above-mentioned jumper to the keyboard substrate, if print wiring in formed on both sides of the keyboard substrate. In such case, however, both sides of the keyboard substrate itself became noticeably expensive. Namely, both sides of the keyboard substrate have to be provided with numerous penetrating holes for the electrical connection of print wirings formed an both sides of the keyboard substrate. The machining of these penetrating holes also increases the cost of the keyboard substrate.

Consequently, regardless of which type of key switch may be used, the manufacture of the whole keyboard consumes a tremendously long time and presents difficulties in ensuring cost reduction.

SUMMARY OF THE INVENTION

It is accordingly the object of this invention to provide a key switch which can be constructed easily, thereby noticeably reducing time and cost in the manufacture of a whole keyboard.

To attain the above-mentioned object, this invention provides a key switch interposed between an electric pulse generator and a receiving circuit. Said key switch comprises:

a substrate prepared from dielectric materials and having first and second surfaces;

a first electrode mounted on the first surface of the substrate to be electrically connected to said electric pulse generator;

a second electrode provided on the second surface of said substrate opposite to said first surface and constituting a capacitor pulsatively storing a static capacity in cooperation with said first electrode and substrate;

a first fixed contact provided on one surface of the substrate in electric contact with one electrode positioned on one surface;

a second fixed contact formed in one surface of the substrate close to the first fixed contact and in electric connection to the signal reception circuit; and changeover means for effecting electrical connection and shutoff between the first and second fixed contacts.

The key switch of this invention offers the advantages that electrical connection and shutoff between the first and second fixed contact are effected by means of a movable contact; static capacity pulsatively stored between the first and second electrodes can flow to the signal reception circuit through the first and second fixed contacts and the movable contact, thereby effecting a switching function; the operation principle of the subject key switch dispenses with the provision of any extra element for each key switch; and it is possible to noticeably reduce the number of parts to be fitted to the substrate surface, reduce the steps of manufacturing the whole keyboard and cut it cost.

The present invention offers further advantages that since the first and second electrodes constitute a capacitor in cooperation with the substrate made from dielectric material, electric connection between the first and second surface of the substrate can be effected; the substrate of a keyboard using key switches embodying this invention can be used as a 2-plane type substrate without being provided with penetrating holes; the first and second electrodes and the first and second fixed contacts can be printed on both surface of the substrate together with wires; though both first and second surfaces of the substrate of the keyboard fitted with the key switches emodying this invention are used, the substrate can be produced inexpensively, thereby reducing the manufacturing cost of the entire keyboard itself; since the first and second fixed contacts are connected by the movable contact from the above-mentioned operation principle, and since the reception circuit is continuously supplied with pulsative signals, a single operation of a key switch embodying this invention ensures a continuous switching input without software control.

DETAILED DESCRIPTION OF THE PREFERRED EMBODIMENTS

Figure 1:
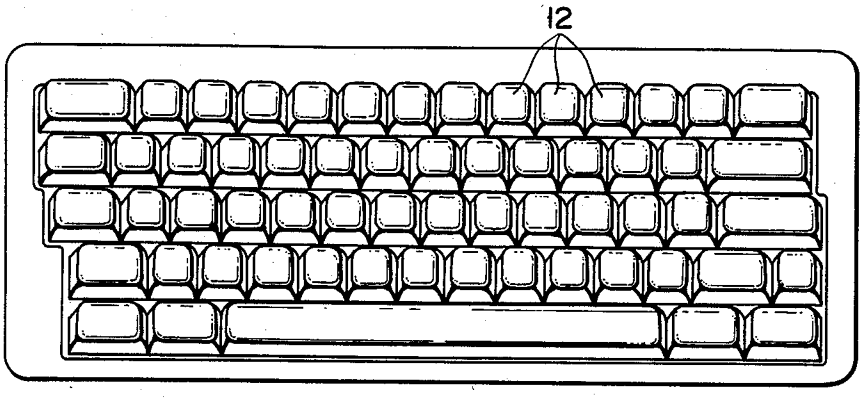
FIG. 1 is a plan view of an entire keyboard.

The keyboard of FIG. 1 according to the first embodiment of this invention provided with numerous key switches 12 is used with a computer and motorized typewriter.

Figure 2:
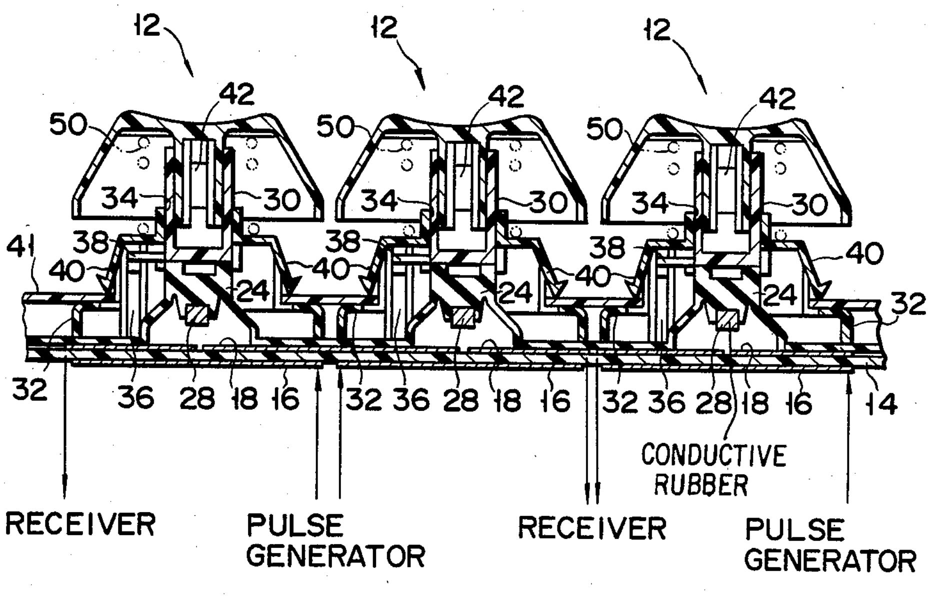
FIG. 2 is a sectional view of key switches according to a first embodiment of this invention which are used with a keyboard of FIG. 1.

The construction of respective key switches 12 are best shown in FIGS. 2 to 5. FIG. 2 indicates substrate 14 of the keyboard. Substrate 14 used in common to key switches 12 is prepared from dielectric material, for example, synthetic resin such as epoxy or polyester. Since key switches 12 have the same construction, description is made of only one of them.

Figure 3:
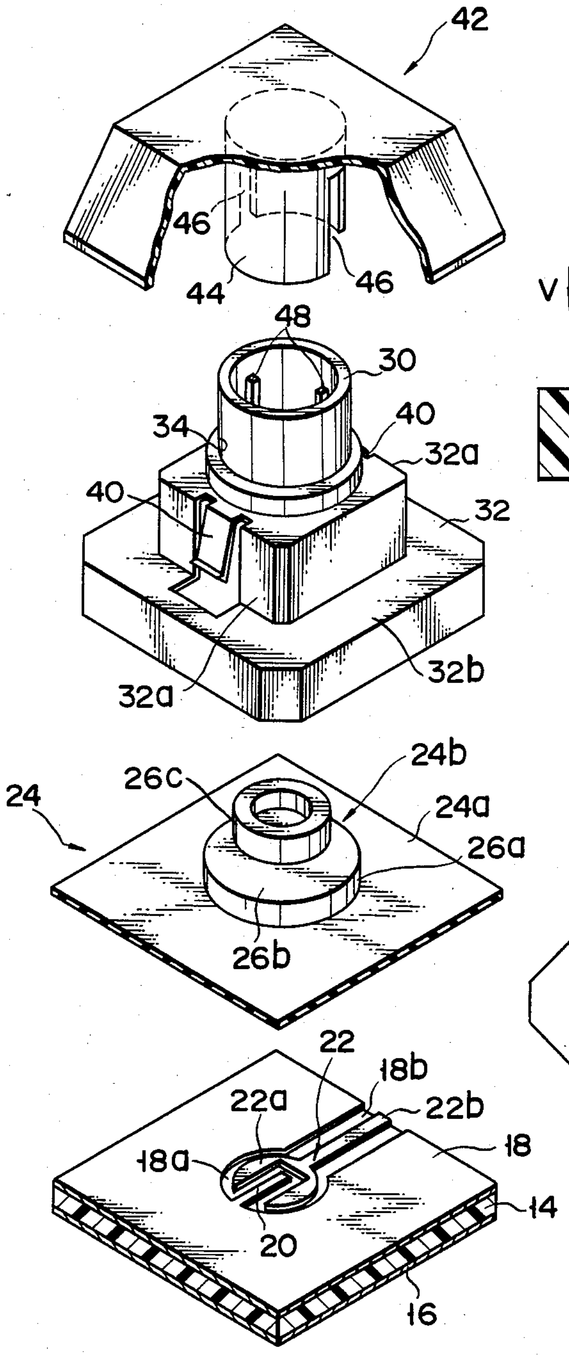
FIG. 3 presents exploded perspective view of the key switch of FIG. 2.
Figure 4:
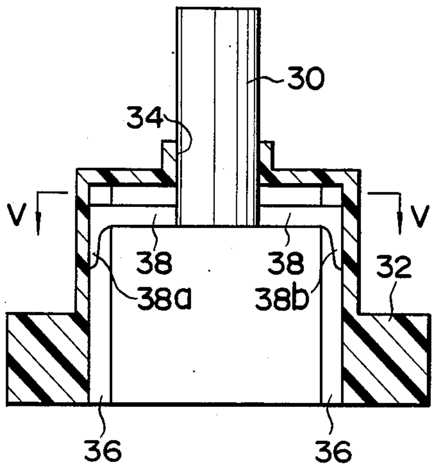
FIG. 4 is a sectional view of a guide housing assembled with a lift stem.

Referring to FIG. 2, first electrode 16 prepared from conductive material is positioned beneath substrate 14. Second electrode 18 prepared from the same conductive material as that of first electrode 16 is positioned on the opposite side of substrate 14 to the first electrode 16. First and second electrode layers 16, 18 are symmetrically shaped with respect to substrate 14. Thus, first and second electrode layers 16, 18 constitute a capacitor jointly with substrate 14. In the case of the above-mentioned first embodiment, second electrode layer 18 is made of a rectangular conductive layer as shown in FIG. 3. A hole 18*a* is formed in second electrode layer 18 to expose the surface of substrate 14. Second electrode layer 18 is provided with elongate notch 18*b* extending from the hole 18*a* to one edge of said second electrode layer 18 to expose the surface of substrate 14. Since first and second electrode have the same shape as mentioned above, first electrode layer 16 is also formed of a conduction layer and provided with a hole and extensive notch (not shown) like above-mentioned hole 18*a* and notch 18*b*.

First electrode layer 16 is electrically connected to a pulse generator generating a pulse voltage signal. Therefore, a capacitor consisting of first and second electrode layers 16, 18 and that portion of substrate 14 which is interposed between electrode layers 16, 18 acts as part of a differentiating circuit. Thus, a static capacity is pulsatively stored between first and second electrode layers 16, 18.

First fixed contact 20 in provided on that portion of substrate 14 which is exposed in hole 18*a* of second electrode layer 18. First fixed contact 20 is formed of a strip integrally extending from the inner edge of hole 18*a* of second electrode layer 18 toward notch 18*b*.

Second fixed contact 22 comprises a portion 22*a* surrounding first fixed contact 20 in hole 18a and extension 22*b* integrally connected to surrounding portion 22*a* and extending through notch 18*a*. Second fixed contact 22, namely, extension 22*b* is connected to a receiving circuit. Actually first and second electrode layers 16, 18 of each key switch 12 and first and second fixed contacts 20, 22 are printed on both top and bottom surfaces of substrate 14. Wires connected to first and second electrode layers 16, 18 and second fixed contact 22 are printed at the same time.

Holder 24 prepared from electrically insulating material suffer to support the later described movable contact is positioned on the second electrode layer 18 of the substrate 14. Holder 24 comprises rectangular sheet 24*a* and hollow cylindrical portion 24*b* projecting upward from the center of sheet 24*a*. Hollow cylindrical portion 24*b* involves larger diameter ring section 26*a*, tapered section 26*b* and smaller diameter section 26*c*. When cylindrical section 24*b* is pressed from above, tapered section 26*b* is mainly undergoes elastic deformation and is crushed. When the pressure is released, hollow cylindrical section 26*b* regains its original shape shown in FIGS. 2 and 3 by its own righting moment. Each key switch holder 24 is composed of part of a single sheet.

Figure 5:
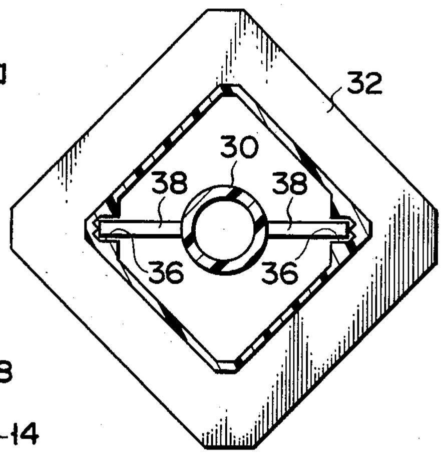
FIG. 5 is a sectional view on line V—V of FIG. 4.

Movable contact 28 is positioned, as shown in FIG. 2, in the apical portion of cylinder 24*b* involved in the holder 24. This movable contact 28 is formed of conductive rubber fabricated, for example by mixing carbon powder with silicone rubber. When the cylindrical section 24*b* of the movable contact holder 24 is crushed, the movable conductive rubber contact 28 contacts both first and second fixed contacts 20, 22. As a result, first and second fixed contacts 20, 22 are electrically connected by movable conductive rubber contact 28, thus forming a closed electric circuit. Hollow cylindrical vertically movable stem 30 open at the top is arranged on the cylindrical portion 24*b*. The vertical movement of stem 30 in guided by housing 32. Guide housing 32 is provided with a stepped portion and has a rectangular form (FIG. 5) as viewed from above. Guide hole 34 informed in the central circular projection of guide housing 32, thereby allowing for the vertical sliding of stem 30 through guide hole 34. As shown in FIG. 5, a pair of oppositely positioned guide arms 38 integrally project from the lower end of vertically movable stem 30. The outer ends of guide arms 38 are slidably engaged with corresponding guide grooves 36. The outer ends of paired guide arms 38 extend downward (FIG. 4), thereby constituting guide projections 38*a*, 38*b* slidably contacting the corresponding bottom walls of guide groove 36. When undergoing no pressure from above, vertically slidable stem 30 is positioned on cylindrical portion 24*b* of holder 24, thereby preventing cylindrical portion 24*b* of holder 24 from being elastically deformed by the weight of vertically movable stem 30. Integral elastically movable engagement pawl 40 projects from the walls 32*a* of the opposite stepped portions of rectangular housing 32. The engagement pawl 40 secures guide housing 32 in a prescribed position. As shown in FIG. 2, guide housing 32 is held between the aforesaid rubber sheet and holding plate 41 having the same size as the rubber sheet. Holding plate 41 (FIG. 12) is provided with a large number of holes allowing for the passage of stepped portion 32 of respective guide housings 32. The stepped portion of guide housing 32 is inserted into the corresponding hole of holding plate 42 with projecting engagement pawl 40 of guide housing 32 drawn thereinto. Later, engagement pawl 40 is made to regain its original position, thereby causing holding plate 41 to be damped between engagement pawl 40 of guide housing 32 and top surface 32*b* of the stepped portion to securely support guide housing 32.

Key top 42 is detachably connected to vertically movable stem 30. Hollow coupling stem 44 (FIG. 3) is made insertible into the stem 30. The outer peripheral wall of coupling stem 44 is provided with a pair of oppositely positioned notches 46 which extend along the axis of coupling stem 44 up to the lower end thereof. A pair of coupling projections 48 engaged with notches 46 and extending along the axis of vertically movable stem 30 are formed on the inner upper wall of the stem 30. Therefore, key top 42 can be connected to vertically movable stem 30 by aligning notches 46 with paired projections 48 and inserting coupling stem 44 of key top 42 into vertically movable stem 30. When key top 42 is connected to vertically movable stem 30 and the weights of the vertically movable stem 30 and key top 42 exert pressure to holder 24, cylindrical portion 24*b* of holder 24 undergoes no elastic deformation.

Description may now be made of the operation of a key switch embodying this invention which is constructed as described above. Since first electrode 16 is connected to the pulse generator, a static capacity is pulsatively stored between first and second electrodes 16, 18 jointly constituting a capacitor. When, under such condition, key top 42 is pressed downward, key top 42 is brought downward together with vertically movable stem 30. When key top 42 drops to a prescribed position, vertically movable stem 30 crushes cylindrical portion 24b of holder 24, thereby causing movable conductive rubber contact 28 of holder 24 to contact both first and second fixed contacts 20, 22. Therefore, the pulse generator is connected to the receiver circuit through first and second fixed contacts 20, 22 which are electrically connected to each other by means of movable conductive rubber contact 28. As a result, a pulse voltage signal is supplied to the receiver circuit from the capacitor which includes first and second electrodes 16, 18. At this time, key switch 12 is rendered conducting.

When a pressing force is released from key top 42, then key top 42, together with vertically movable stem 30, is pushed upward by the righting moment of holder 24. Since cylinder 24*b* of holder 24 regains the position indicated in FIG. 2, movable conductive rubber contact 28 is detached from both first and second fixed contacts 20, 22. Therefore, the first and second fixed contacts 20, 22 are electrically disconnected. Under this condition, a pulse signal is not supplied to the receiver circuit, rendering key switch 12 nonconducting.

This invention is not limited to a key switch according to the above-mentioned embodiment. If a coil spring 50 (indicated in 2 dots-dash lines in FIG. 2) is provided between key top 42 and guide housing 32, then key top 42 can regain its original position quickly, enabling an optional force to be applied for the downward pressing of key top 42.

Description may now be made with reference to FIGS. 6 to 10 of the modifications of first and second fixed contacts 20, 22. Throughout FIGS. 6 to 10, first fixed contact 20 is formed of first conductive layer 52 mounted on the surface of the substrate 14. Second fixed contact 22 consists of second conductive layer 54 interdigitating first conductive layer 52.

Figure 6:
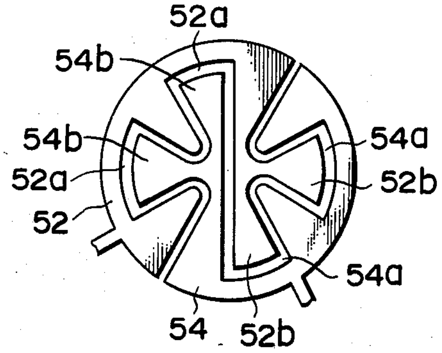
FIGS. 6 to 11 are plan views of respective embodiments illustrating different shapes of the first and second fixed contacts.

Referring to FIG. 6, first and second conductive layers 52, 54 are first fabricated in the semicircular form. A suitable number of notches are cut out in both conductive layer 52, 54. Projections of both interdigitated conductive layers 52, 54 are inserted in the corresponding notches of the other. More particularly projections 52*b*, 54*b* are inserted into corresponding notches 52*a* and 54*a*.

Figure 7:
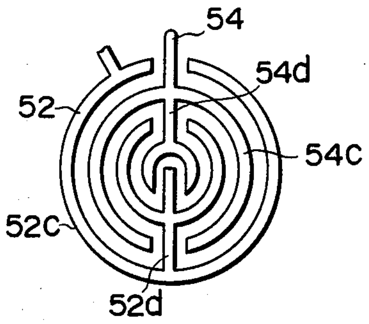

Referring to FIG. 7, first conductive layer 52 comprises double rings 52*c* cut off at one point and straight section 52*d* crosswise bridging the double rings 52*c* and occupying the same position as first fixed contact 20. Second conductive layer 54 comprises a ring 54*c* interposed between double rings 52*c* of first conductive layer 52 and section 54*d* crosswise bridging the ring 54*c* and bearing the same shape as second fixed contact 22.

Figure 8:
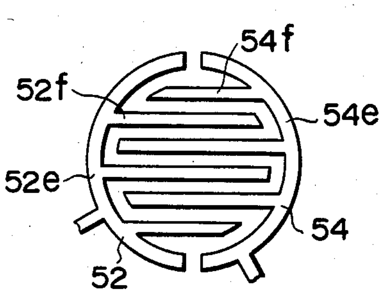

Referring to FIG. 8, first conductive layer 52 is formed like a comb whose base 52*e* has a semicircular form and second conductive layer 54 is similarly formed like a comb whose base 54*e* also has a semicircular form. Teeth 52*f* of first conductive layer 52 interdigitate teeth 54*f* of second conductive layer 54.

Figure 9:
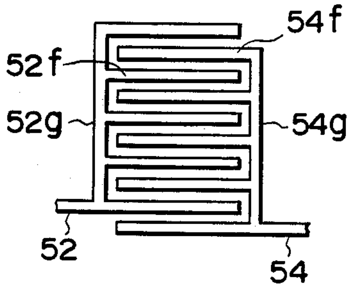

Referring to FIG. 9, first conductive layer 52 in fabricated in the form of a comb where base in made straight, and second conductive layer 54 is also shaped like a comb whose base is also made straight. The teeth of first conductive layer 52 interdigitate those of second conductive layer 54. Further as illustrated in FIG. 9, one digit constituting one end of the base 52*g* of comb-shaped first conductive layer 52 extends outward from the base 54*a*. One digit constituting one end of the base of comb-shaped second conductive layer 54 which faces the said one digit of first conductive layer 52 also extends outward from the base.

Figure 10:
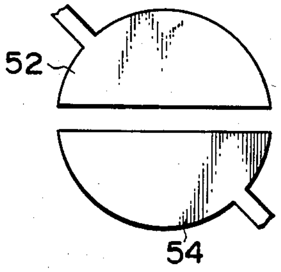

Referring to FIG. 10, first and second semicircular conductive layers 52, 54 face each other at the base. An outward projecting linear connecting portion is formed at that part of the periphery of first semicircular conductive layer 52 which is close to the base, and an outward projecting linear connecting portion is also formed at that part of the periphery of second conductive layer 54 which is close to the base in such a manner that the projecting connecting portion extends in a diametrically opposite direction than that of first conductive layer 52.

Figure 11:
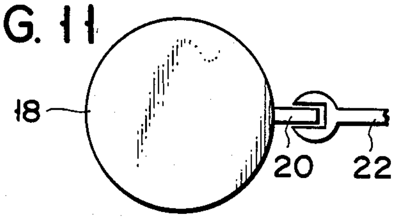

Throughout the foregoing embodiments, first and second fixed contacts are formed in second electrode layer 18. However, this invention is not limited to this arrangement. As shown in FIG. 11, first and second fixed contacts 20, 22 may be formed on the periphery of second electrode layer 18. Further, first and second electrode layers 16, 18 need not assume a rectangular form. For instance, they may be shaped like a circle as illustrated in FIG. 11. At any rate, no limitation is imposed on the shape of the respective electrode layer.

What is claimed is:

1. A key switch interposed between a pulse generator and receiver circuit, comprising:
   - a substrate prepared from dielectric materials and having opposed first and second surfaces;
   - a first electrode formed on the first surface of the substrate and adapted to be electrically connected to one of the pulse generator and the receiver circuit;
   - a second electrode provided on the second surface of the substrate opposite to the first surface thereof to constitute a capacitor for pulsatively storing a static capacity in cooperation with the first electrode and substrate;
   - a first fixed contact formed on one of said first and second surfaces of the substrate in electric contact with the electrode positioned on said one surface;
   - a second fixed contact formed on said one surface of the substrate in the proximity of said first fixed contact and adapted to be in electric connection to other of said pulse generator and said receiver circuit; and
   - changeover means for effecting electric connection and disconnection between said first and second fixed contacts thereby to connect said pulse generator to said receiver circuit via said capacitor.

2. The key switch according to claim 1, wherein said changeover means comprises:
   - a conductive rubber movable contact which is arranged on one side of the substrate for electrically connecting th first and second fixed contacts;
   - holding means for elastically urging the movable contact so as to set it apart from the first and second fixed contacts; and
   - driving means for bringing the movable contact into contact with the first and second fixed contacts against the urging force of the holding means.

3. The key switch according to claim 2, wherein the holding means comprises a holding member prepared from elastic material and surrounded with a flange member, and provided with a movable contact on the inner apical surface; the drive means comprises a movable stem capable of travelling toward and apart from one surface of the substrate and arranged in series with the holding member, and a key top which is connected with the movable stem to press it toward one surface of teh substrate to electrically deform the holding member, thereby effecting the contact of the movable contact with both first and second fixed contacts.

4. The key switch according to claim 1, wherein the first and second electrodes have the same shape.

5. The key switch according to claim 4, wherein said electrode in contact with the first fixed contact is formed of a rectangular electrode layer, and has a circular hole provided at the center and an elongate notch extending from the hole to one edge of the electrode layer; the first fixed contact is formed of a contact strip which is integrally connected at one end with said electrode layer at the periphery of the hole and which extends at the other end in the same direction as the notch; and the second fixed contact comprises an enclosing portion which is positioned in the hole of the electrode layer to partially enclose the contact strip, and a connection member integrally connected with the enclosing portion and extending through the notch.

6. The key switch according to claim 1, wherein said first and second fixed contacts comprise respective first and second conductive layers having interdigitated notches and projections.

7. The key switch according to claim 1, wherein:

said first contact comprises a pair of concentric rings each having an opening cut therein and a straight section crosswise bridging the concentric rings, and said second contact comprises a ring interposed between the concentric rings of said first contact and having an opening through which the straight section of said first contact passes, and a straight section aligned with the straight section of said first contact and integrally connected to a semicircular portion partially surrounding an extension of the straight section of the first contact.

8. The key switch according to claim 1, wherein said first and second contacts comprise combs having semicircular base members and interdigitated comb members extending from said base members.

9. The key switch according to claim 1, wherein said first and second contacts comprise combs having rectangular base members and interdigitated comb members extending from said base members.

10. The key switch according to claim 1, wherein said first and second contacts respectively comprise first and second semicircular conductive layers having flat portions which face each other and are separated from each other by a predetermined distance.

11. The key switch according to claim 1, wherein the electrode in contact with said first contact comprises a circular conductive layer and said first contact comprises an extension of said electrode linearly extending therefrom, and wherein said second contact comprises a circular conductive layer having an opening in which the extension forming said first contact is positioned.

* * * * *